(12) United States Patent
Poledna

(10) Patent No.: US 7,023,870 B2
(45) Date of Patent: Apr. 4, 2006

(54) METHOD FOR OPERATING A DISTRIBUTED COMPUTER SYSTEM

(75) Inventor: Stefan Poledna, Dr.-Teichmann-Gasse (AT)

(73) Assignee: TTTech Computertechnik AG, Vienna (AT)

( * ) Notice: Subject to any disclaimer, the term of this patent is extended or adjusted under 35 U.S.C. 154(b) by 322 days.

(21) Appl. No.: 10/665,583

(22) Filed: Sep. 19, 2003

(65) Prior Publication Data

US 2004/0062265 A1    Apr. 1, 2004

Related U.S. Application Data

(63) Continuation of application No. PCT/AT02/00094, filed on Mar. 27, 2002.

(30) Foreign Application Priority Data

Mar. 30, 2001    (AT) ............................... A 511/2001

(51) Int. Cl.
*H04L 12/56*    (2006.01)
(52) U.S. Cl. .......................................... 370/423; 714/2
(58) Field of Classification Search ................ 370/400, 370/216, 242, 362, 421, 423, 438, 439, 451, 370/489; 714/2, 4, 10, 11, 5, 12, 13, 47, 714/56
See application file for complete search history.

(56) References Cited

U.S. PATENT DOCUMENTS 4,569,015 A    2/1986   Dolev et al.

(Continued)

FOREIGN PATENT DOCUMENTS

DE    197 53 288 A    6/1998

OTHER PUBLICATIONS

Bauer G. et al. Transparent Redundancy in the Time-Triggered Architecture Proceedings International Conference on Dependable Systems and Networks DSN 2000. New York, NY, Jun. 25-28, 2000, International Conference on Dependable Systems and Networks, Los Alamitos, CA: IEEE Comp. SOC, US, pp 5-13.

(Continued)

*Primary Examiner*—Wellington Chin
*Assistant Examiner*—Brenda Pham
(74) *Attorney, Agent, or Firm*—Monte & McGraw, P.C.

(57) ABSTRACT

A method for operation of a distributed computer system (SYS) comprising network nodes (NKN, NK1–NK6), each of which has at least one node controller (STR, ST1–ST6) and one communication controller (KK1–KK6), the communication controllers (KKK, KK1–KK6) being connected to each other via at least one communication channel (BUS), and provision being made between the communication controller (KK1–KK6) and the node controller (STR, ST1–ST6) of a network node (NKN, NK1–NK6) for a fault tolerance layer (FTS, FT1–FT6) that is set up to receive messages exchanged between the network nodes (NKN, NK1–NK6), the fault tolerance layer (FTS, FT1–FT6) deciding, based on information received pertaining to the status of at least one network node(NKN, NK1–NK6), about the functioning of the at least one network node (NK1–NK6) via a coordination procedure, and the coordination result being made available as an output signal (ASS, AS1–AS6), the at least one network node (NKN, NK1–NK6) being triggered as a function of the output signal (ASS, AS1–AS6).

9 Claims, 2 Drawing Sheets

U.S. PATENT DOCUMENTS 5,325,518 A * 6/1994 Bianchini, Jr. ............... 714/31
5,784,547 A * 7/1998 Dittmar et al. ................ 714/4
6,092,213 A * 7/2000 Lennie et al. .................. 714/3
6,625,751 B1 * 9/2003 Starovic et al. .............. 714/11

OTHER PUBLICATIONS

Kopetz H. et al. "Tolerating Arbitrary Node Failures in the Time-Triggered Architecture", Whitepapaer, Mar. 2001.
International Search Report mailed May 9, 2003.

* cited by examiner

METHOD FOR OPERATING A DISTRIBUTED COMPUTER SYSTEM

CROSS-REFERENCE TO RELATED APPLICATION

This application claims priority from Austrian Patent Application A 511/2001, filed 30 Mar. 2001, and is a continuation of PCT Patent Application Serial No. AT02/00094, filed 27 Mar. 2002.

FIELD OF THE INVENTION

The invention relates to a method for operation of a distributed computer system comprising network nodes, each of which has at least one node controller and one communication controller, wherein the communication controllers are connected to each other via at least one communication channel, provision is made between the communication controller and the node controller of a network node for a fault tolerance layer, which is set up to receive messages that are exchanged between the network nodes, and the fault tolerance layer decides, based on information received pertaining to the status of at least one network node, about the functioning of the at least one network node via a coordination procedure.

BACKGROUND OF THE INVENTION

For computer systems having security, availability and fault tolerance requirements, redundant channels and components are typically used in order to handle to the aforementioned requirements—in this regard, see also: "Real-Time Systems: Design Principles for Distributed Embedded Applications; H. Kopetz, Kluwer Academic Publishers, 1997." These redundant channels and components must be implemented in real-time applications typically from a sensor via a computer node up to an actuator. Using them results in significantly higher costs compared to non-redundant systems.

In some applications it is not necessary, because of the application characteristics, to implement each of the channels or components as completely redundant. Brake-by-wire in the automotive field is cited as an example. Because a typical passenger vehicle has at its disposal four braked wheels, the failure of an individual wheel brake can be tolerated. However, it must be ensured in this context that a brake never fails in such a manner that a wheel locks up or is braked too strongly. This would cause the passenger vehicle to become unstable.

In order to be able to safeguard against such an uncontrolled failure of a component, dedicated control links, so-called breaker lines, are used between the actuators and each network node.

For high reliability systems such as brake-by-wire applications, real-time-capable communication systems, which in contrast to event-driven communication protocols (e.g. CAN) offer fault tolerance and minimal fluctuation in the transmission time (latency), are gaining acceptance. TTP/C, for example, one such time-triggered communication system that is already ready for the market and offers, in addition to the reliable transmission of data, a series of higher services such as clock synchronization and membership.

The term membership is to be understood in this context as a service that sends consistent information about the operating state (properly working or defective) of all nodes of the system to all nodes at defined moments—the membership points. The length and the fluctuation of the interval between a membership point and the moment at which the consistent membership information is known to the other nodes are a quality feature of the service parameters of the membership service. A good membership service has a small maximum delay time between the moment of a relevant status change of a node and the moment at which all other nodes have learned of this status change in a consistent way. The term consistent in this connection is to be understood as all network nodes receiving the same information. Thus, for example, in the case of a fault occurring in a network node, all network nodes receive the same fault signal.

The membership service in each communication controller of the network awaits a membership vector in which a bit is assigned to each transmitting node. A transmitter that is labeled in this bit vector as "available" is considered to be in the membership. Precisely one bit in the "membership vector" is statically assigned to each consistent time slot (C-slot) of a TDMA (Time Division Multiple Access) round within the context of the TTP/C.

An essential security advantage of the time-triggered architecture, as it is implemented in TTP/C, is the lack of trigger signals in the communication between communication controller and node controller (processing unit). In this way it can be ensured that a fault cannot be propagated. By strict exclusion of trigger signals in the communication between communication controller and node controller (processing unit), there is in the known systems no possibility for other processing units or for software applications running on them to exert influence on the behavior of a defective processing unit or software application. This fact is especially of relevance then if the defective behavior of a processing unit endangers the security of the overall system. For example, in a "brake-by-wire" system, that is, in a system in which the brakes are controlled purely electronically, a defective software application could block one of the four wheels of an automobile, whereupon the control over the behavior of the entire vehicle in spite of intervention of the remaining wheel computers can become impossible. However, a general transmission of control pulses also presents itself as a source of danger for the security of the overall system. Also, dedicated cutoff lines lead to an increased resource demand and to the introduction of additional error sources.

One such method has become known from the document "Dependable Systems and Networks (DSN 200)", New York, IEEE Press, p. 5. In this method the transmission of the output signals is carried out via the bus, and the receiver nodes are then indirectly controlled, specifically by arrangement of independent measures of the receiver nodes so that a fault-tolerant direct transmission of trigger signals between the nodes is not possible. The document of Kopetz, H. et al., "Tolerating Arbitrary Node Failures in the Time-Triggered Architecture", white paper, March 2001, describes the fault tolerance and the possibilities of fault processing in an architecture that used the TTP/C protocol, for example also a resynchronization mechanism in the case of multiple faults. A direct fault-tolerant control of network nodes is likewise not described in this document.

The object of the present invention is to overcome the cited disadvantages of the prior art.

This objective is achieved using a method of the kind mentioned at the outset in that the coordination result is made available as an output signal to one or more hardware outputs of the communication controller and the at least one network node is controlled as a function of this output signal.

Owing to the invention, other network nodes can force a faulty application or processing unit into a specific behavior corresponding to the security design, and, thus, specific fault scenarios of the overall system can be triggered in a controlled manner. Trigger signals for direct triggering of the actuators can be transmitted in a time-triggered architecture taking into account the application-specific security claims, whereby, for example, a node identified as faulty can be switched off by other nodes. Through the coordination mechanism in the fault tolerance layer, a faulty network node can thus be prevented from having an effect on other nodes in the system. In this way it can be ensured that no individual failures lead to a failure of the overall system.

BRIEF SUMMARY OF THE INVENTION

According to one version of the invention, the result of the coordination can be made available as a digital output signal on at least one pin of the communication controller.

Membership information of the communication controller in question is beneficially incorporated into the coordination procedure. As a result, the occurrence of a faulty node that then prevents other nodes from sending evaluation messages can be taken into account in the coordination by virtue of the faulty node occupying the time slot of other nodes.

Furthermore, the fault tolerance layer can use its own data structures, which are independent of the data structure of the communication controller and the processing unit, for the selection of a coordination algorithm and the messages employed for the coordination.

Moreover, the coordination result can also be made available within network nodes in a memory storage area.

Additional advantages can be achieved by at least one actuator being brought into a preferred or secure state as a function of the output signal.

Beneficially, the communication between the network nodes occurs on a time-triggered basis according to the TTP/C protocol.

BRIEF DESCRIPTION OF THE DRAWINGS

The invention, together with additional exemplary embodiments, is explained below in relation to several exemplary embodiments illustrated in the drawing, which should not be construed to limit the scope of the invention. Shown diagramatically therein are.

DETAILED DESCRIPTION OF THE INVENTION

Figure 1:
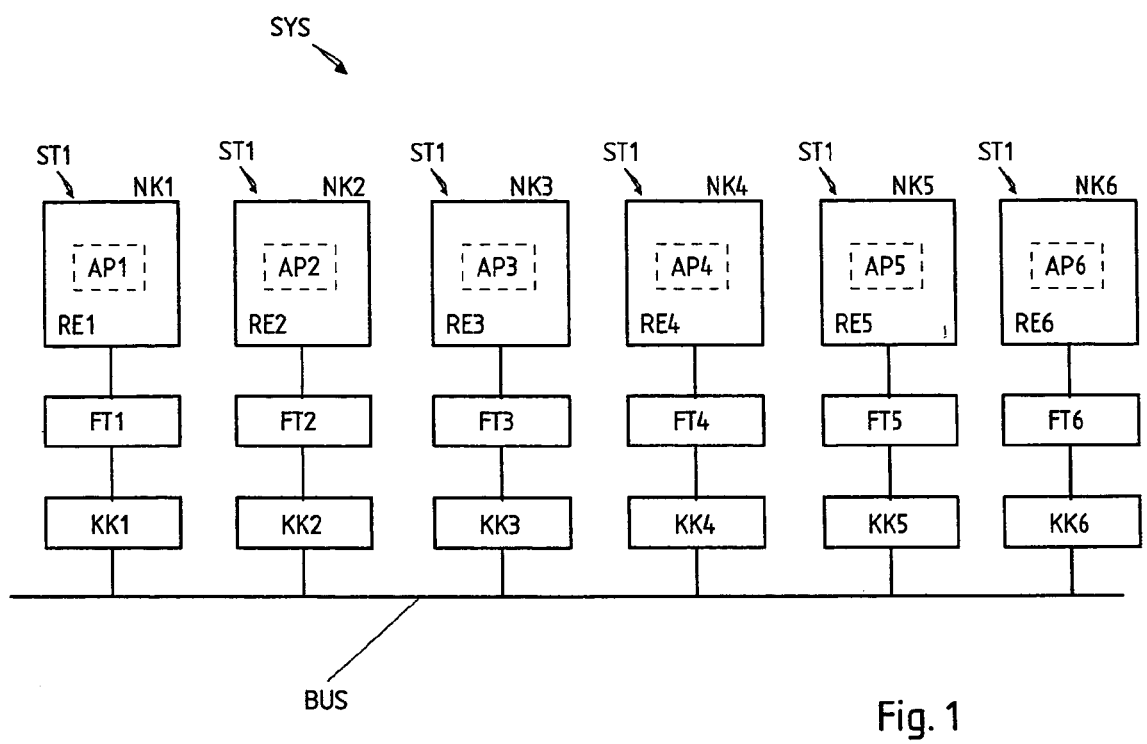
FIG. 1—a distributed computer system with time-triggered communication

FIG. 1 shows a schematic illustration of a distributed computer system SYS having six network nodes NK1–NK6, each of which is constructed of a node controller ST1–ST6 and a communication controller KK1–KK6, the communication controllers being connected to each other via a bus BUS1. The term node controller ST1–ST6 is to be understood in this document as meaning a processing unit RE1–RE6 that is equipped to perform triggering tasks, or tasks in a general sense, that are intended for the particular network node NK1–NK6 within the context of computer system SYS, for example the operation of an actuator, by means of appropriate software applications AP1–AP6.

Preferably, the communication between network nodes NK1–NK6 occurs according to a time-triggered transmission protocol, for example the TTP/C protocol. Regarding the concept of the TTP/C protocol, see for example also European Patent 146 612.

Some or all of the network nodes NK1–NK6 can monitor the behavior or the operating state of other network nodes NK1–NK6, wherein the monitoring can occur reciprocally. Thus, a node that monitors another node can itself be monitored by other nodes. The results of the monitoring are exchanged via bus BUS as evaluation messages between communication controllers KK1–KK6 of network nodes NK1–NK6.

Located between each of node controllers ST1–ST6 and communication controllers KK1–KK6 is a fault tolerance layer FT1–FT6 that receives the evaluation messages which are transmitted via bus BUS and executes a coordination procedure with respect to the individual evaluation messages regarding the functioning of network nodes. Regarding the concept of the fault tolerance layer, see for example: "Transparent Redundancy in the Time Triggered Architecture; G. Bauer and H. Kopetz; Dependable Systems and Networks (DSN 200), New York, IEEE Press, p. 5–13." In practice, a fault tolerance layer can be implemented, for example, by using a suitably programmed microprocessor arranged between communication controller KK1–KK6 and node controller ST1–ST2. Another possibility for creating a fault tolerance layer consists of implementing it in a communication controller as a hardware unit.

The following algorithms come into consideration for any variants of the coordination procedure:

For a number n of evaluation messages used by fault tolerance layer FT within the context of the coordination, a number m of evaluation messages must be greater than n/2 in order to lead to a result (majority coordination);

Or all evaluation messages taken into consideration must be equal (n=n)-unanimity.

The coordination result can be made available as a digital or analog output signal ASS within network nodes in a memory storage area and at a hardware output of communication controller KK1–KK6, for example, a pin of communication controller KK1–KK6. As a function of output signal ASS, a restart or an emergency shutoff of a processing unit can be forced, and/or an actuator AKT can be brought into a preferred or secure state, as described further below.

Figure 2:
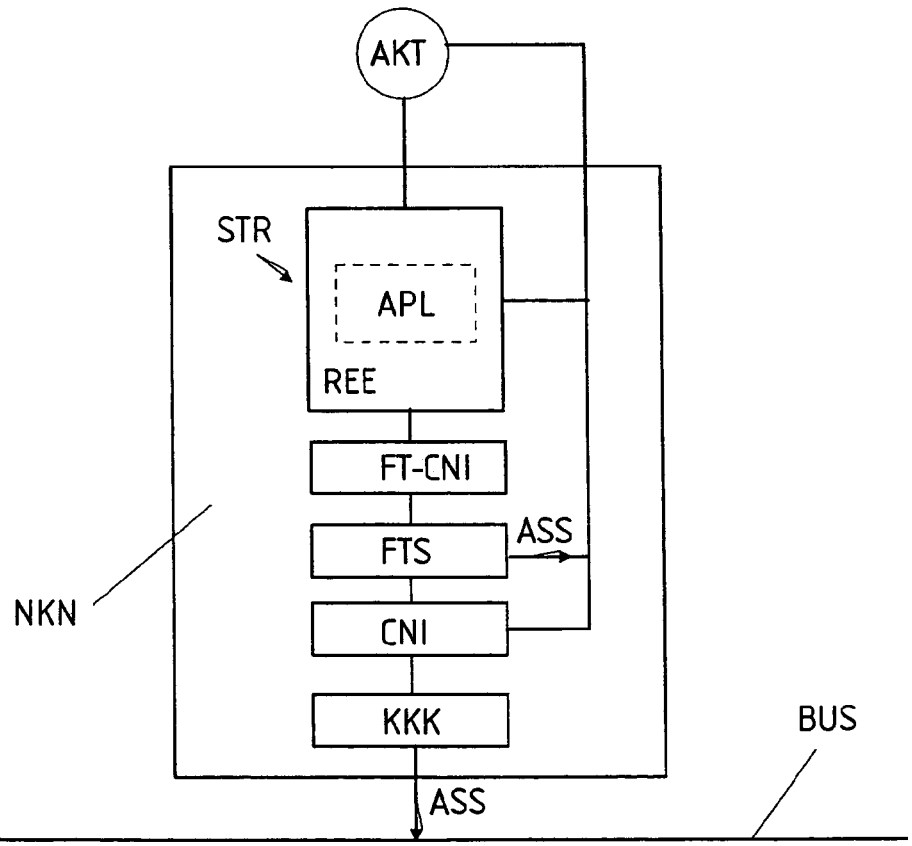
FIG. 2—a logic structure of a network node with a fault tolerance layer.

According to FIG. 2, a network node NKN has a node controller STR (a processing unit REE with corresponding software applications), for example a correspondingly programmed CPU (Central Processing Unit) and a communication controller KKK. Located between processing unit REE and communication controller KKK is a data interface (CNI), through which, for security reasons, no trigger signals can be exchanged, and the aforementioned fault tolerance layer FTS.

Communication controller KKK controls the communication sequence with the other network nodes via bus BUS. In so doing, data are read from data interface CNI and transmitted in time slots that have been defined a priori according to the time-triggered communication scheme that is used. Likewise, messages received for processing unit REE are stored in data interface CNI. The task of fault tolerance layer FTS is, among other things, to prepare the data stored in data interface CNI for software applications APL running on processing unit REE to trigger network node NWK or the actuator according to requirements and to store it in data interface FT-CNI, which is between fault tolerance layer FTS and processing unit REE. For example, redundant messages about a variable are put together, values are transformed or special values are calculated and, thus, software application(s) APL stored on processing unit REE are relieved of routine activities and complexity. Software application(s) APL ultimately take(s) on the task of triggering actuator AKT, for example a brake actuator.

In accordance with the invention, fault tolerance layer (FTS), as already mentioned above, can make the coordination result available as output signal ASS. This output signal ASS can be made available within network nodes in a memory storage area, for example in an area of data interface CNI.

This data interface CNI and/or fault tolerance layer FTS can be connected to processing unit REE so that output signal ASS, if necessary, can be transmitted to processing unit REE, it being possible to equip the processing unit REE to switch off or restart at a pre-determinable value of output signal ASS. Thus, a restart or emergency cutoff of node controller STR can be forced by output signal ASS. Moreover, data interface CNI and/or fault tolerance layer FTS can be connected to an actuator AKT so that the latter may be shifted by the value of output signal ASS into a preferred or secure state.

For the coordination procedure itself, as already mentioned above, several variants are in principle conceivable. However, what is essential in this is the presence of fault tolerance layer FTS between communication controller KKK and processing unit REE, fault tolerance layer FTS executing the coordination procedure independent of processing unit REE and making available the coordination result as an output signal ASS.

In order to ensure the independence of fault tolerance layer FTS, fault tolerance layer FTS can have data structures for the selection of a coordination algorithm and the evaluation messages employed for the coordination that are independent from the data structures of communication controller KKK and node controller STR.

Preferably, with the method of the present invention in fault tolerance layer FTS, the functioning of node NKN, which is assigned to fault tolerance layer FTS, is controlled, output signal ASS in this case relating to the functioning of this node NKN. The evaluation messages of the other nodes that are enlisted for the coordination then naturally also concern the status of node NKN.

Figure 3:
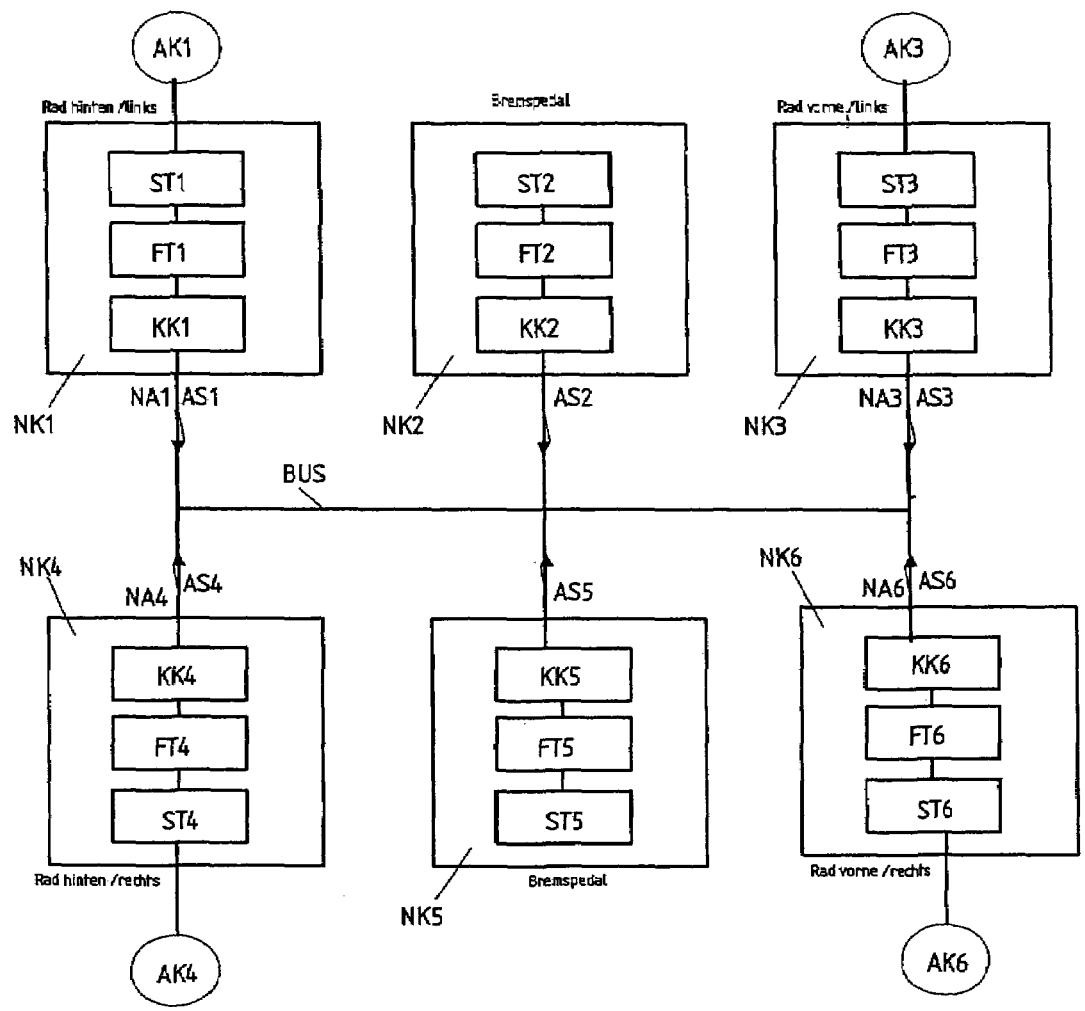
FIG. 3—a simplified illustration of a brake-by-wire architecture.

FIG. 3 shows a simplified illustration of a possible brake-by-wire architecture. In this architecture, each of network nodes NK1, NK3, NK4, NK6 handles the control of a wheel. Two network nodes NK2, NK5 redundantly detect the brake pedal position. The network nodes NK1–NK6 are connected to each other via a bus BUS, which normally consists of two communication channels that redundantly transmit all security-relevant messages and each of which has a TTP/C communication controller, a fault tolerance layer FT1–FT6 and a node controller ST1–ST6. In principle, however, a different time-triggered communication protocol can be used instead of the TTP/C protocol. The invention makes it possible to introduce an additional control regarding the behavior of node controller ST1–ST6 and the actuators connected thereto, wherein no concessions have to be made regarding the security of the overall system.

In order to be able to tolerate an individual fault, network nodes NK2, NK5, which are used to detect the brake pedal position, must be designed with redundancy. Because a typical passenger car has four braked wheels, the failure of an individual wheel brake can be tolerated. Therefore, only one network node NK1, NK3, NK4, NK6 is located at each wheel for the brake controller.

Running on each processing unit of a wheel node is a software application that controls the behavior of the other processing units on the wheels. Thus, node controllers ST1–ST6 can monitor the other node controllers ST1–ST6. Both messages that are sent via bus BUS and measured data about the vehicle performance can be employed as data for these control tasks. The evaluation of the other processing units or network nodes NK1–NK6 is sent as evaluation message NA1–NA6 via the bus. Each communication controller KK1–KK6 then receives in each communication round the evaluation messages NA1, NA3, NA4, NA6 of the three other wheel nodes and stores them in the particular data interface CNI that is assigned to it. The independent fault tolerance layer FT1–FT6 of each network node can form its coordination result from received evaluation messages NA1–NA6 together with the local message of the particular node and make said coordination result available as output signal AS1–AS6 within the particular network node NK1–NK6 internally and at a hardware output of the accompanying communication controller KK1–KK6.

As already mentioned above, majority decision or unanimity are possible as a basic coordination procedure. Moreover, the membership information can be incorporated into the coordination result, provided that the time-triggered communication protocol has such at its disposition. TTP/C offers a distributed membership information service that can be enlisted for the coordination. By linking with the membership information, the following variants used for the coordination are produced:

Use of only the membership information;
Use of dedicated messages (evaluation messages) for the coordination procedure;
Use of dedicated messages and membership information.

If network nodes NK1–NK6 then agree by majority or unanimously, that the behavior of a processing unit or the software application that is running there endangers the security of the overall system, fault tolerance layer FT1–FT6 of this node generates a corresponding output signal AS1–AS6.

Which consequences are to be drawn from such a coordination result must be determined in the a priori configuration of the system. In the listed example, it appears sensible both to bring the brake actuator into a secure state and to force a restart of the faulty processing unit in order to remedy temporary faults of the software application(s).-9-

Because there is a fresh coordination operation in every communication round, the control over the connected actuator can be transferred back to the assigned node controller or processing unit after reintegration of the network node is completed.

Because the information about the coordination result is available internally within the particular data interface CNI and also is transferred from communication controller KK1–KK6 to the other network nodes NK1–NK6, they can react to the fault behavior accordingly by redistributing the braking force in response to the situation.

The introduction of an independent fault tolerance layer for a coordination procedure then creates the possibility of reciprocal control of processing units beyond the time-triggered bus and data interface CNI. This is necessary in order to be able to correctly react to specific fault scenarios. Nevertheless, it can be ensured in this manner that no individual fault endangers the security of the overall system.

What is claimed is:

1. A method for operation of a distributed computer system (SYS) comprising network nodes (NKN, NK1–NK6), each of which has at least one node controller (STR, ST1–ST6) and one communication controller (KK1–KK6), the communication controllers (KKK, KK1–KK6) being connected to each other via at least one communication channel (BUS), and provision being made between the communication controller (KK1–KK6) and the node controller (STR, ST1–ST6) of a network node (NKN, NK1–NK6) for a fault tolerance layer (FTS, FT1–FT6) that is set up to receive messages exchanged between the network nodes (NKN, NK1–NK6), and the fault tolerance layer (FTS, FT1–FT6) deciding, based on information received pertaining to the status of at least one network node (NKN, NK1–NK6), about the functioning of the at least one network node (NK1–NK6) via a coordination procedure, wherein the coordination result is made available as an output signal (ASS, AS1–AS6) at one or more hardware outputs of the communication controller (KKK, KK1–KK6), and the at least one network node (NKN, NK1–NK6) being triggered as a function of the output signal (ASS, AS1–AS6).

2. The method as described in claim 1, wherein the result of the coordination is made available as a digital output signal on at least one pin of the communication controller (KKK, KK1–KK6).

3. The method as described in claim 1, wherein membership information of the communication controller (KKK, KK1–KK6) in question is included in the coordination procedure.

4. The method as described in claim 1, wherein the fault tolerance layer (FTS, FT1–FT6) uses its own data structure, which is independent of the data structures of the communication controller (KKK, KK1–KK6) and the node controller (STR, ST1–ST2), for the selection of a coordination algorithm and the evaluation messages (NA1–NA6) enlisted for the coordination.

5. The method as described in claim 1, wherein the coordination result is made available within network nodes in a memory storage area.

6. The method as described in claim 1, wherein at least one node controller (STR, ST1–ST6) is restarted as a function of the output signal (ASS, AS1–AS6).

7. The method as described in claim 1, wherein an emergency shutoff of a node controller (ST1–ST6) is executed as a function of the output signal (ASS, AS1–AS6).

8. The method as described in claim 1, wherein at least one network node (NKN, NK1–NK6) has an actuator (AKT, AK1–AK4) connected to the node controller (STR, ST1–ST6), and the actuator (AKT, AK1–AK4) is brought into a preferred or secure state by the output signal (ASS, AS1–AS6).

9. The method as described in claim 1, wherein the communication between the network nodes (NKN, NK1–NK6) occurs on a time-triggered basis according to the TTP/C protocol.

* * * * *